United States Patent
Vonach et al.

(10) Patent No.: US 9,247,617 B2
(45) Date of Patent: Jan. 26, 2016

(54) CONTROL LOOP WITH A VARIABLE TIME CONSTANT FOR POWER FACTOR CORRECTION FOR A LOAD CIRCUIT COMPRISING LIGHT-EMITTING MEANS

(71) Applicant: TRIDONIC GMBH & CO KG, Dornbirn (AT)

(72) Inventors: Christoph Vonach, Dornbirn (AT); Hans Auer, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/427,217

(22) PCT Filed: Sep. 10, 2013

(86) PCT No.: PCT/AT2013/000146
§ 371 (c)(1),
(2) Date: Mar. 10, 2015

(87) PCT Pub. No.: WO2014/040097
PCT Pub. Date: Mar. 20, 2014

(65) Prior Publication Data
US 2015/0237702 A1    Aug. 20, 2015

(30) Foreign Application Priority Data
Sep. 11, 2012   (DE) .......................... 10 2012 216 047

(51) Int. Cl.
*H05B 37/02* (2006.01)
*H05B 33/08* (2006.01)

(52) U.S. Cl.
CPC ............ *H05B 37/02* (2013.01); *H05B 33/0815* (2013.01); *H05B 33/0851* (2013.01)

(58) Field of Classification Search
CPC ........... H05B 33/0815; H05B 33/0818; H05B 33/0851; H05B 33/0845; H05B 33/0848; H05B 37/02; H05B 33/0824; H05B 33/0842; H05B 33/086
See application file for complete search history.

(56) References Cited

U.S. PATENT DOCUMENTS

| 2002/0135339 | A1 | 9/2002 | Tang et al. | |
| 2010/0085024 | A1 | 4/2010 | Houston et al. | |
| 2011/0241569 | A1* | 10/2011 | Zimmermann .... | H05B 33/0815 315/301 |
| 2012/0133295 | A1* | 5/2012 | Pereira ............... | H05B 33/0815 315/210 |

(Continued)

FOREIGN PATENT DOCUMENTS

| DE | 19708783 C1 | 10/1998 |
| DE | 102005018755 A1 | 10/2006 |

(Continued)

*Primary Examiner* — Jany Richardson
(74) *Attorney, Agent, or Firm* — Volpe and Koenig, P.C.

(57) ABSTRACT

The invention proposes a method for operating an actively clocked PFC circuit (2) having a directly or indirectly connected load circuit (5) at the output of the PFC circuit (2), wherein the load circuit (5) has at least one luminous means, in particular one or more LEDs (4), wherein the PFC circuit (2) is controlled by a PFC controller (30) in such a manner that the PFC controller (30) determines a control parameter, in particular a switched-on time period (ton), for the clocking of the PFC circuit (2) on the basis of at least one first controller setting (RE_fast) and one second controller setting (RE_slow), wherein the time of a change from the first controller setting (RE_fast) to the second controller setting (RE_slow) is dependent on the directly or indirectly determined average value of the control parameter, in particular the switched-on time period (ton).

17 Claims, 4 Drawing Sheets

(56) References Cited

U.S. PATENT DOCUMENTS

2014/0361707 A1* 12/2014 Mitterbacher ..... H05B 33/0848 315/291
2015/0054421 A1* 2/2015 Auer ................ H05B 33/0809 315/247

FOREIGN PATENT DOCUMENTS

| DE | 102008057333 A1 | 5/2010 |
| DE | 102010039430 A1 | 2/2012 |
| DE | 102012206349 A1 | 6/2013 |
| EP | 1189490 A1 | 3/2002 |

* cited by examiner

CONTROL LOOP WITH A VARIABLE TIME CONSTANT FOR POWER FACTOR CORRECTION FOR A LOAD CIRCUIT COMPRISING LIGHT-EMITTING MEANS

FIELD OF THE INVENTION

The invention generally relates to circuits for operating light-emitting means, such as, for example, gas discharge lamps or inorganic or organic LEDs, i.e. light-emitting diodes.

BACKGROUND

In many operating devices for light-emitting means, it is conventional for the light-emitting means to be operated either at a high frequency, in particular in the case of gas discharge lamps, or else by means of pulse modulation, for example in particular in the case of LEDs. For this purpose, so-called driver circuits are provided, which can be in the form of a pulse modulator, a full-bridge or half-bridge circuit, etc. Generally, a DC link voltage is supplied to these driver circuits, which DC link voltage may have a so-called ripple superimposed on it, if appropriate.

In order to provide this DC link voltage, often a so-called PFC (power factor correction) circuit, also referred to as active power factor correction circuit, is used. This PFC circuit generates the DC link voltage on the basis of a generally rectified mains supply voltage whilst maintaining a power factor which is as high as possible.

Within the scope of the present invention, it is always the case of so-called actively clocked PFC circuits, i.e. circuits in which the power consumption by the PFC circuit is preset by a clocking of a switching element, such as, for example, a transistor or a MOSFET. When the switching element is closed, in this case an inductance is magnetized, and this inductance is then discharged when the switch is open via a diode into a storage capacitor. Typical circuits are, for example, a boost converter, an isolated flyback converter or a so-called SEPIC.

The switching element of the PFC circuit and, for example, the switch-on time period Ton of the switching element is generally regulated by a control circuit. It is further known to change the regulator settings depending on externally supplied dimming commands, for example.

A certain problem arises to the extent that, during a transition time after a change in the regulator settings, the energy transmitted by the PFC circuit can be too high or too low. When this transition time of, for example, 40 ms is reached, this temporary excessively high or excessively low transmitted energy is detectable by the human eye in the form of a flash of light or a low light intensity.

SUMMARY

The object of the present invention consists in improving an actively clocked PFC circuit in respect of its behavior in the case of a change in the regulator settings. In particular, the object of the invention consists in preventing short-term flashes of light or low light intensities.

This object is achieved according to the invention by the features of the independent claims. The dependent claims develop the essential concept of the invention in a particularly advantageous manner.

A first aspect of the invention relates to a method for operating an actively clocked PFC circuit comprising a directly or indirectly connected load circuit at the output of the PFC circuit. The load circuit has at least one light-emitting means, in particular one or more LEDs. The load circuit can have at least one active or passive driver circuit for the light-emitting means, for example one or more switching regulators such as a half-bridge or a buck converter or else a linear regulator. The PFC circuit is actuated by a PFC regulator in such a way that the PFC regulator determines, on the basis of at least one first and one second regulator setting, a control parameter, in particular a switch-on time period, for the clocking of the PFC circuit. The time of a change from the first regulator setting to the second regulator setting is dependent on the directly or indirectly determined average of the control parameter, in particular the switch-on time period.

A further aspect of the invention relates to an integrated circuit, in particular an ASIC or a microcontroller or a hybrid version thereof, which is configured for implementing such a method or for changing the regulator setting of a PFC regulator in this way.

A further aspect of the invention relates to a circuit for operating an actively clocked PFC circuit comprising a directly or indirectly connected load circuit at the output of the PFC circuit. The load circuit has at least one light-emitting means, in particular one or more LEDs. The PFC circuit is actuated by a PFC regulator in such a way that the PFC regulator determines, on the basis of at least one first and one second regulator setting, a control parameter, in particular a switch-on time period, for the clocking of the PFC circuit. The time of a change from the first regulator setting to the second regulator setting is dependent on the directly or indirectly determined average of the control parameter, in particular the switch-on time period.

A further aspect of the invention relates to a lighting module comprising an actively clocked PFC circuit, a load circuit, which is connected to the output of the PFC circuit directly or indirectly, wherein, in the load circuit, at least one light-emitting means, in particular one or more LEDs, is connectable, and a PFC regulator, which is configured to actuate the PFC circuit in such a way that the PFC regulator determines, on the basis of at least one first and one second regulator setting, a control parameter, in particular a switch-on time period, for the clocking of the PFC circuit. The time of a change from the first regulator setting to the second regulator setting is dependent on the directly or indirectly determined average of the control parameter, in particular the switch-on time period.

Preferably, the time of the change in the regulator setting is determined by virtue of a comparison of the switch-on time period with the time average of the switch-on time period.

Preferably, the change in the regulator setting is performed when it is detected that the switch-on time period determined for the clocking of the PFC circuit and the time average of the switch-on time period are identical.

Preferably, the PFC regulator determines the switch-on time period for the clocking of the PFC circuit, and the regulator setting is only changed when the switched-on time period is in a predefined corridor around the time average of the switch-on time period.

Preferably, in order to form the time average of the switch-on time period, a predefined number of periods of the DC link voltage generated by the PFC circuit is taken into consideration.

Preferably, the time of the change in the regulator setting is determined by virtue of a comparison between the DC link voltage generated by the PFC circuit and a setpoint value preset for the DC link voltage.

Preferably, the regulator setting is changed only when the DC link voltage generated by the PFC circuit crosses the setpoint value preset for the DC link voltage.

Preferably, the regulator setting is changed only when the DC link voltage generated by the PFC circuit is within a predefined range around the setpoint value for the DC link voltage.

Preferably, the change in the regulator setting corresponds to an adjustment of the regulator speed, in particular the time constants of the PFC regulator.

Preferably, the first regulator setting represents a quicker regulator speed in comparison with the second regulator setting.

Preferably, a preferably rectified AC voltage is supplied to the PFC circuit.

Preferably, the change in the regulator setting is caused by a change in the load or by a change in the operating phase of the light-emitting means.

Preferably, the change in the load is determined on the basis of parameters of the load circuit.

Preferably, a change in the load in the form of dimming of the light-emitting means or in the form of a change in the number of light-emitting means is determined.

BRIEF DESCRIPTION OF THE DRAWINGS

Further aspects, features and properties of the present invention will be explained in more detail using exemplary embodiments from the description below and using the figures in the attached drawings.

DETAILED DESCRIPTION OF THE PREFERRED EMBODIMENTS

Figure 1:
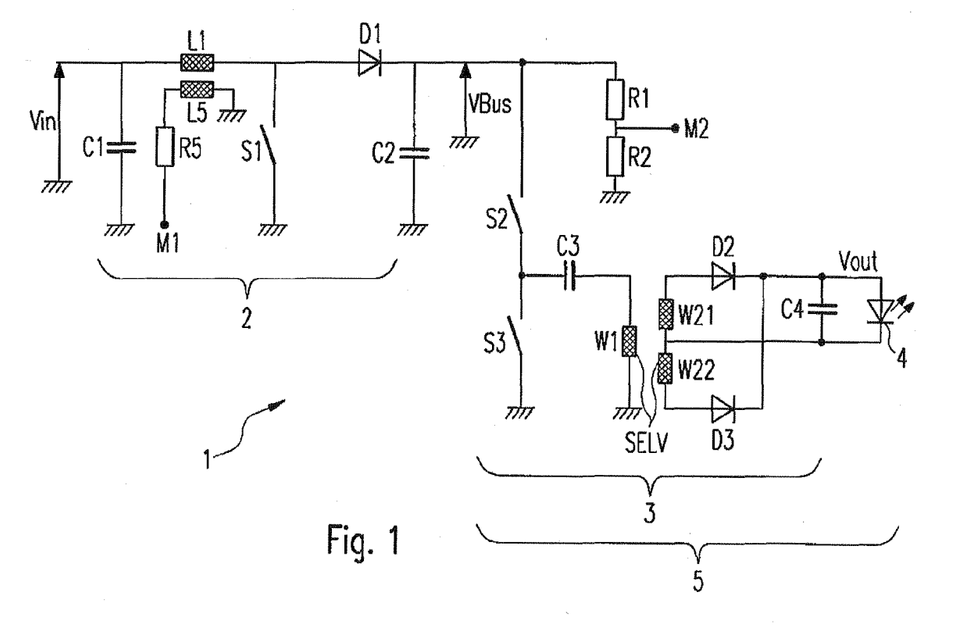
FIG. 1 shows an exemplary design of a PFC circuit comprising a load circuit having a driver circuit and LEDs as light-emitting means.

FIG. 1 shows a first exemplary embodiment of an operating device 1 in accordance with the present invention. The operating device 1 comprises an adaptive PFC circuit 2 and a driver 3 for operating an LED 4. The LED 4 is only one example of a light-emitting means which can be supplied by the operating device 1. Alternatively, an OLED, i.e. an organic LED, or, for example, a fluorescent lamp or gas discharge lamp can be operated. The number of light-emitting means operated is also variable. Instead of only one light-emitting means, it is also possible for a plurality of light-emitting means connected in series, for example, to be provided.

As can be seen from FIG. 1, the LED 4 or the light-emitting means is supplied on the basis of an input voltage Vin, which may be in particular a sinusoidal AC mains voltage. The input voltage Vin is a preferably rectified AC mains voltage which has positive half-cycles with a frequency of 100 Hz, for example. The rectified AC mains voltage is then supplied to the clocked PFC circuit 2.

The PFC circuit 2 preferably has, on the input side, a smoothing capacitor C1. The input voltage Vin is filtered by the smoothing capacitor C1 and supplied to an inductance L1. The smoothing capacitor C1 is in this case dimensioned such that it only smoothes radiofrequency interference and therefore acts as a filter capacitor. Low-frequency smoothing of the input voltage does not take place. The inductance is connected in series with a diode D1 or with the anode of the diode D1. The PFC circuit 2 comprises a controllable switch S1, for example in the form of a transistor or a field-effect transistor, which is connected between ground on one side and the node between the inductance L1 and the diode D1 on the other side. In order to stabilize the DC link voltage Vbus generated by the PFC circuit 2, an electrolytic storage capacitor C2 is connected downstream of the diode D1. The electrolytic storage capacitor C2 is used for low-frequency smoothing and stabilizing of the DC link voltage Vbus.

By repeatedly closing and opening the switch S1, the inductance L1 is charged and discharged correspondingly. If the switch S1 is on, the inductance L1 is magnetically charged. The charging current then flows via the switch S1 to ground. When the switch S1 is switched off, a discharge current flows via the inductance L1 and the diode D1 to the load and the electrolytic storage capacitor C2. The determination of the time for closing of the switch S1 can be performed by means of monitoring at a measurement point M2, wherein the fact of demagnetization of the inductance L1 being reached can be detected with the aid of the magnetically coupled secondary winding L5 at this measurement point. The opening of the switch S1 can take place, for example, once a preset switch-on time period has been reached or once a preset current through the switch S1 has been reached. However, this is only one example of the regulation of the PFC circuit 2. The PFC circuit 2 can also be operated in the discontinuous current mode or in the continuous current mode as an alternative to this example of the so-called borderline mode.

This DC link voltage Vbus of the PFC circuit 2 is preferably a DC voltage or an approximately constant voltage having a residual ripple which, in turn, is supplied to a load circuit 5, which in particular has the driver circuit 3 or a converter and the LED or LEDs 4 to be supplied. The driver circuit 3 generates a supply voltage Vout for supplying the LED 4. The driver circuit 3 can in this case also generate a constant output current for feeding the LED 4.

The driver circuit 3 comprises two switches S2, S3 connected in the form of a half-bridge. The switch S2 is connected to the DC link voltage Vbus of the PFC circuit 2, while the switch S3 is connected to ground. The switches in the half-bridge are switched on and off alternately in a known manner in order to generate a desired power, i.e. a desired current and/or a desired voltage for the LED. In particular, the LED can be dimmed depending on the control of the switches S2, S3. The node between the two switches S2, S3 is connected to a series circuit comprising a capacitor C3 and a primary side W1 of a transformer, which forms a safety extra-low voltage isolation barrier SELV. The secondary side of the transformer, for example comprising two windings W21, W22, is connected to the LED 4 in each case via a diode D2, D3. A capacitor C4 can be connected in parallel with the LED 4.

Figure 2:
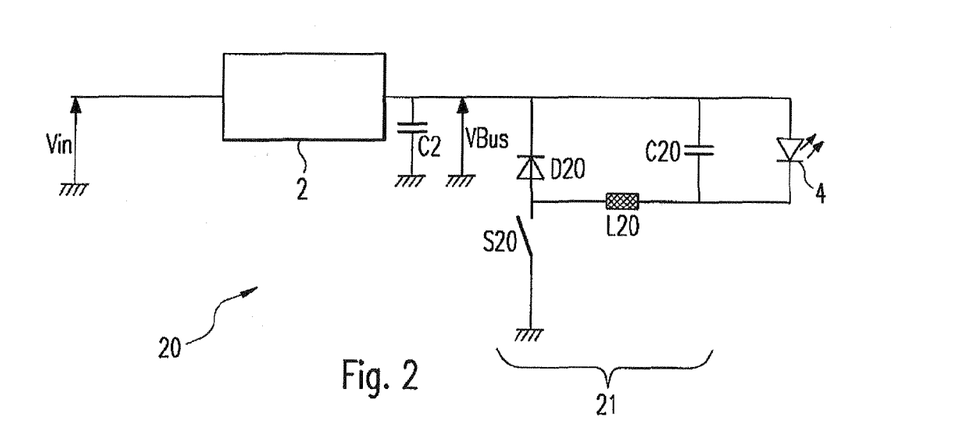
FIG. 2 shows a further exemplary design of a PFC circuit comprising a load circuit having a driver circuit and LEDs as light-emitting means.

FIG. 2 shows a second exemplary embodiment of an operating device 20 in accordance with the present invention. In principle, the operating device 20 corresponds to the operating device 1 shown in FIG. 1, with only the driver circuit for the light-emitting means being configured differently.

The driver circuit 21 of the second exemplary embodiment has a switch S20 and is in the form of a buck converter. When the switch S20 is closed, the current flows through the LED 4 or LEDs and an inductance or coil L20 and increases substantially linearly with the magnetization of the inductance L20. When the switch S20 is switched off, the energy of the inductance L20 decays substantially linearly owing to a current flow in turn through the LED 4 and a freewheeling diode D20 until the switch S20 is finally switched on again.

Figure 3:
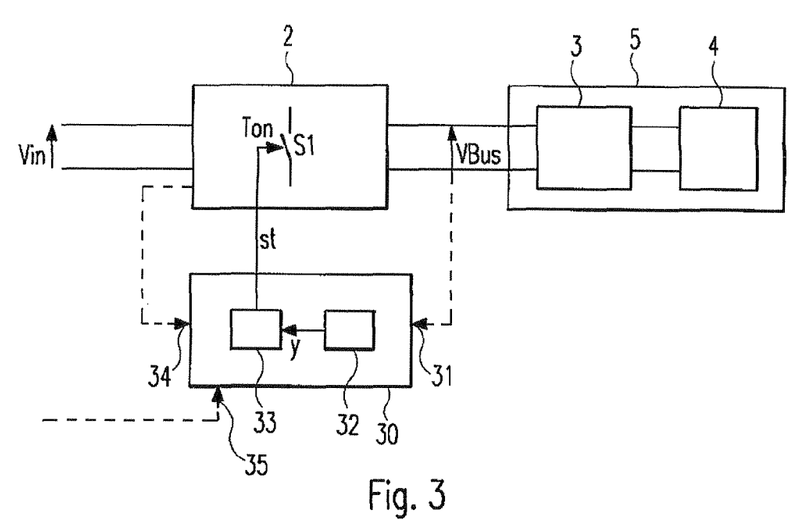
FIG. 3 shows, schematically, an operating device with an adaptive PFC circuit in accordance with the present invention.

FIG. 3 shows a PFC regulator 30 according to the invention for switching on and off the switch S1 in the PFC circuit 2. The PFC regulator 30 is preferably configured as a digital regulator.

In principle, for active power factor correction, the switch S1 in the PFC circuit is controlled by the PFC regulator 30 in such a way that a current with a sinusoidal envelope is generated by the inductance L1, wherein the envelope is in phase with the input voltage Vin. The switch S1 is preferably clocked at a substantially higher frequency, for example at least 1 kHz or at least 10 kHz, than the frequency of the input voltage Vin, as rectified mains voltage, which is typically 100 Hz. In this way, in combination with the input filter, for example a filter capacitor C1, a sinusoidal current consumption from the grid can result.

In order to determine the switch-on time period Ton or the switch-off time period of the switch S1, the PFC regulator 30 now requires information preferably relating to the DC link voltage Vbus or relating to the zero crossing of the current through the inductance L1.

The DC link voltage Vbus, as shown in FIG. 1, can be determined via a voltage divider R1, R2 arranged at the output of the PFC circuit 2, for example. The corresponding measurement point M2 is located between the two resistors R1, R2 of the voltage divider. A zero crossing of the current through the inductance L1 can be determined or established via a secondary winding L5 coupled to the inductance L1, for example, as shown in FIG. 1. This secondary winding L5 is connected on one side to ground and on the other side to a corresponding measurement point M1 via a resistor R5. Alternative embodiments for measuring these parameters, for example via a voltage divider provided in parallel with the switch S1, are known.

First, the present value of the DC link voltage Vbus is detected via an input line 31 of the PFC regulator 30, which input line is preferably connected to the measurement point M2. The value of the DC link voltage Vbus is preferably passed on to an arithmetic logic unit 32 in digital form. This arithmetic logic unit 32 serves the purpose of calculating a control value y in each clock cycle of the PFC regulator 30, which control value is transmitted to a control block 33. The control block 33 converts the control value y into a control signal st for operating the switch S1 and therefore controls the clocking of said switch.

Turning on of the switch S1 in this case preferably takes place at a time at which, if possible, no current is flowing through the diode D1 since, as a result, the switching losses are reduced. For this purpose, the secondary winding L5 shown in FIG. 1 and the input line 34 connected to the measurement point M1 are used. The time of a zero crossing of the current through the inductance L1 is detected by the control block 33, and the switch S1 is preferably switched on again thereupon.

The control value y passed on by the arithmetic logic unit 32 presets to the control block 33 how long the switch S1 is switched on for. By virtue of this time period, the power consumption of the ballast and therefore the magnitude of the DC link voltage $V_{bus}$ provided are determined. However, it is also possible for the duty factor or switch-on frequency of the switch S1 to be changed depending on the present control value y instead of the switch-on time of said switch.

The PFC regulator 30 preferably has a further input line 35, via which a setpoint value for the DC link voltage Vbus_set can be supplied to the arithmetic logic unit 32. The PFC regulator 30 then uses the clocking of the switch S1, in particular the switch-on time of the switch S1 or the duty factor thereof or the switch-on frequency thereof, as control variable for regulating the DC link voltage $V_{bus}$ with respect to the setpoint value preset Vbus_set.

Meanwhile it is known to identify a change in the power consumption of the load circuit, for example, by means of feedback signals from the region of the PFC circuit or the load circuit 5 or via an applied external signal and thereupon to change the control loop and, for example, the time constants of the regulation. When a low power consumption is identified, the control loop can be slowed down, for example.

If a change in the regulator speed from a high regulator speed with, for example, a small time constant, to a slow regulation speed in state-dependent fashion takes place and this transition is initiated in a region in which the PFC circuit 2 is at that time in an extreme region of the switch-on time period time modulation (maximum amplitude), there will be a relatively long period of time before the PFC regulator with the slow regulator speed now set will again reach a steady state.

In this transition time period, excessive transmission of energy by the PFC circuit 2 will take place, which can ultimately be reflected in an excessively high LED current. If this transition time period between the changeover of the time constants up to steady-state correction with the lower regulator speed is in a time range of 40 ms, for example, which can be resolved by the human eye, the changeover from a faster regulator speed to a slower regulator speed will be perceived visually as a flash of light.

If the changeover from a faster regulation speed to a lower regulation speed is resolved in a region in which the switch-on time period time modulation is at that time in the region of the smallest switch-on time period, there may be a so-called undershoot, i.e. an excessively low power is transmitted by the PFC circuit 2 in a region of 40 ms, for example, which is then perceived visually owing to a lower intensity of the LED string or even owing to the LED string being extinguished.

The parameters of the control loop can also be dependent on other parameters than the power consumption, such as, for example, on the operating phase of the light-emitting means. During the preheating and striking phase of a gas discharge lamp, the arithmetic logic unit 32 preferably uses sets of parameters which result in the PFC regulator 2 responding very quickly to changing situations in order to ensure that the required power can be provided in any event. During normal operation of the gas discharge lamp, i.e. after striking thereof, on the other hand, a slower regulator speed is used, with the result that only harmonics below a preset level are radiated back onto the grid.

Figure 4:
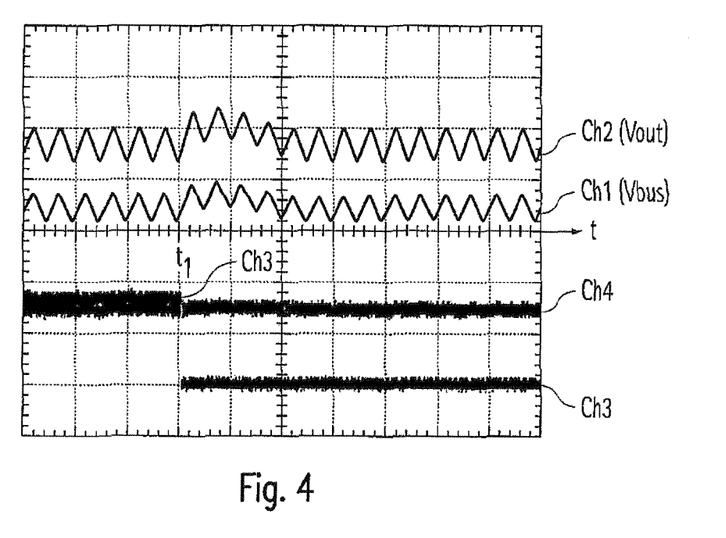
FIG. 4 shows the waveform of the DC link voltage in the case of a change in the regulation parameters in accordance with the prior art.

FIG. 4 shows the waveform of the DC link voltage Vbus in the case of a change in the regulation parameters at an arbitrary point in time. The waveform of the DC link voltage Vbus over time is identified by the reference symbol Ch1. In the case of a constant setting of the regulator parameters or the regulator speed, the DC link voltage Vbus is a constant voltage corresponding to the setpoint value preset Vbus_set of, for example, 400 V with a ripple or a residual ripple with a frequency of 100 Hz. The supply voltage Vout is represented by the reference symbol Ch2 and is, correspondingly, a constant value of 5 V, for example, with ripple. The supply current or the current supplied to the light-emitting means, on the other hand, also remains constant in a transition time period after a change in the control parameters, for example at 1 A; see reference symbol Ch4.

The regulator speed is now reduced at time t1. This reduction is reflected in FIG. 4 by the drop in the curve Ch3 at time t1.

The time t1 is selected arbitrarily in accordance with the prior art, with the result that, as shown in FIG. 4, an undesired short-term increase in the DC link voltage Vbus and a flash of light may arise, as described above.

Figure 5:
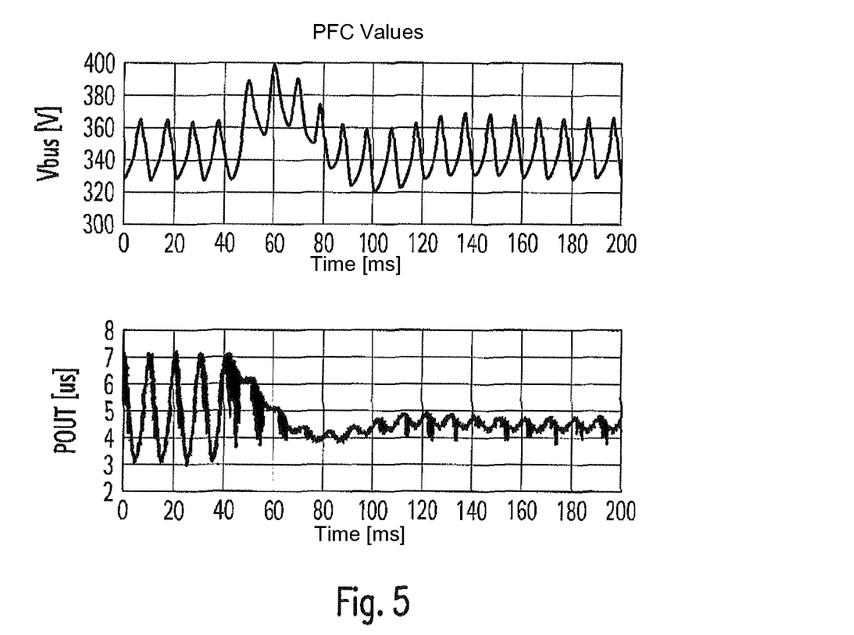
FIG. 5 likewise shows the waveform of the DC link voltage in the case of a change in the regulation parameters in accordance with the prior art.

FIG. 5 likewise shows this phenomenon. At approximately t=40 ms, the regulator speed is reduced and the DC link voltage Vbus increases by nearly 40 V during 40 ms. The effect of this change can easily be perceived by the human eye.

In accordance with the invention, provision is therefore made for in particular the transition from high regulator speed to low regulator speed to only be permissible when the switch-on time period time modulation, i.e. the Ton time modulation of the PFC regulator, is within a predefined corridor around the time average of the switch-on time period. This represents a first embodiment of the invention.

The best solution in accordance with the first embodiment consists in changing the regulation parameters only at the point in time at which the actual switch-on time period corresponds to the switch-on time period average. The actual switch-on time period is in this case preferably the present switch-on time period of the switch S1 in the PFC circuit 2.

Alternatively, a change in the regulation parameters or the regulation speed can only be performed when the switch-on time period is within a preset window around the average. Preferably, the window is +/−1%, +/−2%, +/−5% or +/−10% of the average.

Meanwhile, the average of the switch-on time period can vary over time, with the result that it is possibly necessary for this embodiment to use a moving average by averaging of previous switch-on time period time cycles. For effective averaging, more than ten system periods for the averaging need to be used, for example.

For example, a simple moving average, in which the last x values of the switch-on time period are weighted identically, or a weighted moving average in which, for example, a linearly falling weighting is assigned to older switch-on time period values can be used.

For example, in the case of a quick regulator speed, the switch-on time period can be varied within a preset time range by the PFC regulator 30. On the other hand, in the case of a slower regulator speed, the switch-on time period can only now be varied in a narrower time range than that for the fast regulator properties. The slower speed which is brought about, for example, by corresponding adjustment of the time constants of the regulation, prevents steady-state control deviations, but needs more time owing to the narrower time range for regulating to the average value of the switch-on time period.

Alternatively, a change from a faster regulation speed to a slower regulation speed can only be performed when the switch-on time period is within the narrower switch-on time period range provided for the slower regulation speed.

In accordance with another exemplary embodiment, which is preferred over the first example, the time for the change in the regulator parameters, in particular the regulator speed, in particular in the regulator speed from fast to slow is determined as follows.

A suitable time is taken as the time at which the DC link voltage Vbus provided with a ripple of 100 Hz, for example, crosses the setpoint value preset Vbus_set of 400 volts DC, for example. This corresponds to the state of the PFC regulator in which the switch-on time period also assumes the average. Meanwhile, it has the advantage that no level shift is required independently of the load. Therefore, a determination based on the moving average mentioned in connection with the preceding exemplary embodiment is not necessary.

Alternatively, the regulator parameters are changed as soon as the DC link voltage Vbus is within a predefined range around the setpoint value preset Vbus_set, for example within a range of +/−1, 2, 5 or 10 V or, for example within a specific percentage range around the setpoint value preset Vbus_set.

In accordance with this exemplary embodiment, the regulation parameters are changed when the measured DC link voltage Vbus corresponds to the setpoint value preset Vbus_set.

Figure 6:
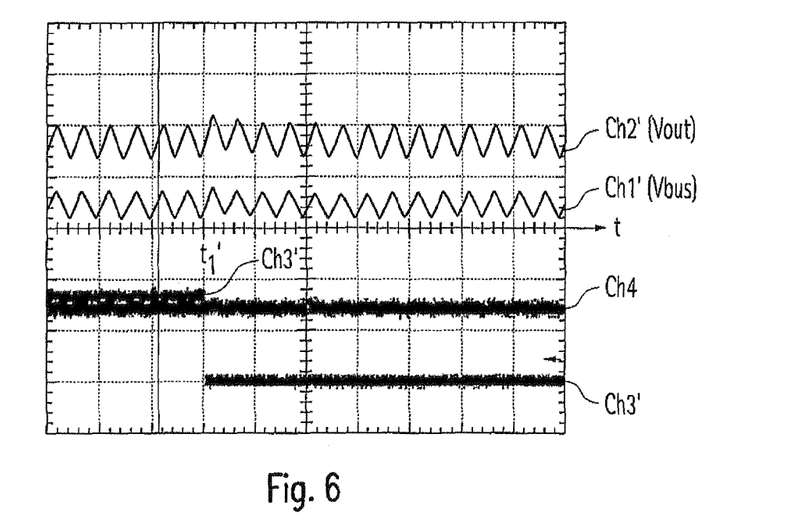
FIG. 6 shows the waveform of the DC link voltage in the case of a change in the regulation parameters in accordance with the present invention.

FIG. 6 shows how the time period of the transition between the faster regulator setting and the slower regulator setting is reduced in accordance with the invention.

The time t1' of the reduction in the regulator speed is selected in accordance with the invention. The reduction is not performed immediately, for example, when sudden changes in load are expected. Instead, there is preferably a wait time before the switch-on time period is within a specific corridor around the switch-on time period average or before the DC link voltage Vbus crosses the setpoint value preset Vbus_set.

In accordance with the invention and as shown by curves Ch1' and Ch2', the DC link voltage Vbus and the supply voltage Vout reach the steady state more quickly than in the prior art illustrated in FIG. 4. The increase in voltage during the transition time period is also smaller in comparison with the prior art.

An embodiment of the PFC regulator 30 or of the arithmetic logic unit 32 will be explained below:

The present actual value of the DC link voltage Vbus is in this case preferably detected by the measurement point M2 shown in FIG. 1. For digital further-processing, this analog value of the DC link voltage Vbus is converted into a digital value by an analog-to-digital converter ADC. The conversion preferably takes place in each clock cycle of the PFC regulator 30.

The digital value of the DC link voltage Vbus is compared with the setpoint value for the DC link voltage Vbus_set which is preferably supplied via the input line 35. As soon as the measured digitized value reaches the setpoint value, this is identified by a corresponding identification unit.

A multiplexer MUX has an output for outputting regulator properties RE of the PFC circuit 2. These regulator properties RE are, for example, the parameters of a P regulator, PI regulator or PID regulator, which influence the response behavior over time thereof. Furthermore, the multiplexer MUX has a first input for a first set of regulator parameters RE_slow and a second input for a second set of regulator parameters RE_fast. The second set of regulator parameters RE_fast causes a faster response behavior of the PFC circuit over time than the first set of regulator parameters RE_slow.

The arithmetic logic unit 32 shown in FIG. 3 calculates in particular the control value y depending on the output of the multiplexer MUX.

It is possible to signal to the multiplexer MUX via a further signaling input that, for example, owing to a sudden change in load, a reduction in the regulator speed is intended to be performed.

If the fact of the setpoint value Vbus_set being reached is now identified by the identification unit, the multiplexer MUX can output the slower regulator parameters RE_slow at its output. This is preferably only intended to take place when a corresponding command for reducing the regulator speed is also present at the signaling input. This command may be an external signal or may be generated by the PFC regulator itself, for example on the basis of feedback signals from the PFC circuit 2 and/or the load circuit 5.

Examples of events which can trigger such a command or a change in the regulator properties are in particular sudden changes in load, i.e. in the case of a completely installed LED module in particular sudden changes in dimming value, with the result that the PFC regulator responds more quickly than during steady-state diming value operation in the region of the sudden change in dimming, preferably.

In other words, the measured DC link voltage Vbus is compared with the setpoint value preset in order to detect the time or the time region in which the DC link voltage corresponds to the setpoint value preset. Only in this time or in this time window is the change in the regulator properties enabled.

In accordance with one embodiment of the invention, the PFC regulator 30 is configured as a microcontroller, to which the dimming value preset is preferably supplied. This PFC regulator can therefore initiate the change in the temporal properties of the PFC regulator in a time period shortly prior to the implementation of the sudden change in dimming at the LED string.

In accordance with the invention, the time of the change in the regulator properties can thus be optimized. After a command for changing the regulator properties or for reducing the regulator speed, there needs to be a wait time of at most 5 ms until the change can also be implemented, in accordance with the invention. This time period corresponds to half a period of the residual ripple of the DC link voltage Vbus.

The PFC circuit 2 can also alternatively be supplied a DC voltage, i.e. a constant voltage. Alternatively, the optimization of the time of the change in the regulator properties according to the invention can also be combined with a THD (Total Harmonic Distortion) correction of the power factor correction.

Preferably, the comparison between the DC link voltage and the setpoint value preset and also the adjustment of the regulation parameters are implemented digitally, as is also the case for the PFC regulation algorithm itself.

The invention can be applied to gas discharge lamps, but in particular to LED strings. In the LED sector, a further example of a sudden change in load, i.e. of a change in the regulator parameters, results in the case of selective connection/disconnection of LEDs in the LED string.

One exemplary embodiment consists in different monochromatic LEDs being used, such as red, green, blue LEDs, for example. It is also possible, for example, for red LEDs to be combined with dye-converted blue LEDs. Preferably, the monochromatic LEDs produce a mixed light in the form of a white light. An event for a change in the regulator parameters or for a sudden change in load can then be, for example, the selective connection/disconnection of monochromatic LEDs, in particular of red LEDs, for changing the color of the mixed light or for changing the color temperature of white light LED modules.

What is claimed is:

1. A method for operating an actively clocked PFC circuit (2) comprising a directly or indirectly connected load circuit (5) at the output of the PFC circuit (2),
wherein the load circuit (5) has at least one light-emitting means,
wherein the PFC circuit (2) is actuated by a PFC regulator (30) in such a way that the PFC regulator (30) determines, on the basis of at least one first regulator setting (RE_fast) and one second regulator setting (RE_slow), a switch-on time period (ton), for clocking of the PFC circuit (2),
wherein the time of a change from the first regulator setting (RE_fast) to the second regulator setting (RE_slow) is dependent on the directly or indirectly determined average of the switch-on time period (ton).

2. The method as claimed in claim 1, wherein the time of the change in the regulator setting is determined by a comparison of the switch-on time period (ton) with the time average of the switch-on time period (ton).

3. The method as claimed in claim 2, wherein the change in the regulator setting is performed when it is detected that the switch-on time period (ton) determined for the clocking of the PFC circuit (2) and the time average of the switch-on time period (ton) are identical.

4. The method as claimed in claim 1, wherein the PFC regulator (30) determines the switch-on time period for the clocking of the PFC circuit (2), and the regulator setting is only changed when the switched-on time period is in a predefined corridor around the time average of the switch-on time period.

5. The method as claimed in claim 2, wherein, in order to form the time average of the switch-on time period (ton), a predefined number of periods of the DC link voltage (Vbus) generated by the PFC circuit (2) is taken into consideration.

6. The method as claimed in claim 1, wherein the time of the change in the regulator setting is determined by a comparison between the DC link voltage (Vbus) generated by the PFC circuit (2) and a setpoint value preset for the DC link voltage (Vbus_set).

7. The method as claimed in claim 6, wherein the regulator setting is changed only when the DC link voltage (Vbus) generated by the PFC circuit (2) crosses the setpoint value preset for the DC link voltage (Vbus_set).

8. The method as claimed in claim 6, wherein the regulator setting is changed only when the DC link voltage (Vbus) generated by the PFC circuit (2) is within a predefined range around the setpoint value (Vbus_set) for the DC link voltage.

9. The method as claimed in claim 1, wherein the change in the regulator setting corresponds to an adjustment of the time constants of the PFC regulator (30).

10. The method as claimed in claim 1, wherein the first regulator setting (RE_fast) represents a quicker regulator speed in comparison with the second regulator setting (RE_slow).

11. The method as claimed in claim 1, wherein a preferably rectified AC voltage is supplied to the PFC circuit (2).

12. The method as claimed in claim 1, wherein the change in the regulator setting is caused by a change in the load or by a change in the operating phase of the light-emitting means.

13. The method as claimed in claim 12, wherein the change in the load is determined on the basis of parameters of the load circuit (5).

14. The method as claimed in claim 12, wherein a change in the load in the form of dimming of the light-emitting means or in the form of a change in the number of light-emitting means is determined.

15. An integrated circuit, which is configured for implementing a method or for changing the regulator setting of a PFC regulator as claimed in claim 1.

16. A circuit for operating an actively clocked PFC circuit (2) comprising a directly or indirectly connected load circuit (5) at the output of the PFC circuit (2), wherein the load circuit (5) has at least one light-emitting means, wherein the PFC circuit (2) is actuated by a PFC regulator (30) in such a way that the PFC regulator (30) determines, on the basis of at least one first regulator setting (RE_fast) and one second regulator setting (RE_slow), a control parameter, in particular a switch-on time period (ton), for clocking of the PFC circuit (2), wherein the time of a change from the first regulator setting (RE_fast) to the second regulator setting (RE_slow) is dependent on the directly or indirectly determined average of the control parameter, in particular the switch-on time period (ton).

17. A lighting module, comprising an actively clocked PFC circuit (2), a load circuit (5) which is connected directly or indirectly to the output of the PFC circuit (2), wherein at least one light-emitting means is connectable in the load circuit (5), a PFC regulator (30) which is configured to actuate the PFC circuit (2) in such a way that the PFC regulator (30) determines, on the basis of at least one first regulator setting (RE_fast) and one second regulator setting (RE_slow), a switch-on time period (ton), for the clocking of the PFC circuit (2), wherein the time of a change from the first regulator setting (RE_fast) to the second regulator setting (RE_slow) is dependent on the directly or indirectly determined average of the switch-on time period (ton).

* * * * *